(12) United States Patent
Ootsu et al.

(10) Patent No.: US 7,403,193 B2
(45) Date of Patent: Jul. 22, 2008

(54) IMAGE DISPLAY DEVICE (75) Inventors: Ryouichi Ootsu, Ichinomiya (JP); Kimitoshi Ougiichi, Mobara (JP); Eisaku Hazawa, Mobara (JP)

(73) Assignee: Hitachi Displays, Ltd., Mobara-shi (JP)

( * ) Notice: Subject to any disclaimer, the term of this patent is extended or adjusted under 35 U.S.C. 154(b) by 559 days.

(21) Appl. No.: 10/695,832

(22) Filed: Oct. 30, 2003

(65) Prior Publication Data
US 2004/0135753 A1 Jul. 15, 2004

(30) Foreign Application Priority Data
Oct. 30, 2002 (JP) .............................. 2002-315555

(51) Int. Cl.
*G09G 5/00* (2006.01)
(52) U.S. Cl. ........................... 345/204; 345/87; 345/89; 345/100; 345/104; 345/206; 349/149; 349/150; 349/151; 349/152
(58) Field of Classification Search ............... 345/87, 345/98, 100, 103, 104, 106, 204–206; 349/151, 349/152, 155, 139, 54
See application file for complete search history.

(56) References Cited

U.S. PATENT DOCUMENTS

| | | | | |
|---|---|---|---|---|
| 5,852,485 A | * | 12/1998 | Shimada et al. ............ | 349/141 |
| 5,945,984 A | * | 8/1999 | Kuwashiro ................. | 345/206 |
| 6,052,171 A | | 4/2000 | Kawaguchi | |
| 6,172,732 B1 | * | 1/2001 | Hayakawa et al. ......... | 349/152 |
| 6,621,547 B2 | * | 9/2003 | Kang ......................... | 349/151 |
| 6,680,759 B2 | * | 1/2004 | Ogawa ........................ | 349/54 |
| 6,822,719 B2 | * | 11/2004 | Song et al. .................. | 349/151 |
| 6,864,937 B2 | * | 3/2005 | Moon et al. ................. | 349/139 |
| 2002/0044246 A1 | | 4/2002 | Moon et al. | |

FOREIGN PATENT DOCUMENTS

| | | |
|---|---|---|
| JP | 11-142887 | 5/1999 |
| JP | 11-316386 | 11/1999 |
| JP | 2001-356708 | 12/2001 |

* cited by examiner

*Primary Examiner*—Richard Hjerpe
*Assistant Examiner*—Jennifer T. Nguyen
(74) *Attorney, Agent, or Firm*—Antonelli, Terry, Stout & Kraus, LLP.

(57) ABSTRACT

When one signal line group and another signal line group, which differs from the one signal line group in length, are arranged adjacent to each other, a disconnection due to static electricity which is caused by a spark generated between a signal line of the one signal line group and a signal line of the other signal line group can be prevented. For this purpose, the image signal line is specifically configured such that, on a substrate, a first signal line group in which a plurality of first signal lines are arranged in parallel and a second signal line group in which a plurality of second signal lines are arranged in parallel in a region arranged adjacent to the first signal line group are formed, and dummy lines are arranged between the first signal line group and the second signal line group.

6 Claims, 8 Drawing Sheets

IMAGE DISPLAY DEVICE

BACKGROUND OF THE INVENTION

The present invention relates to an image display device, and, more particularly, to an image display device of the type which is referred to as an active matrix type image display device, for example.

A typical active matrix type liquid crystal display device includes, inside of the panel thereof, gate signal lines which supply scanning signals to a pixel group consisting of respective pixels which are arranged in parallel in one direction and drain signal lines which supply video signals to the respective pixels to which the scanning signals are supplied.

Each pixel has a switching element which is operated in response to receipt of the scanning signal, a pixel electrode to which signals from the drain signal lines are supplied through the switching element, and a counter electrode which generates an electric field for controlling the optical transmissivity of the liquid crystal material disposed between the pixel electrode and the counter electrode.

The supply of the scanning signals to the gate signal lines and the supply of the video signals to the drain signal lines are respectively performed by a scanning signal drive circuit and a video signal drive circuit, each of which is constituted of semiconductor devices which are mounted on a surface of one of the substrates of the panel on which the gate signal lines and the drain signal lines are formed (hereinafter, these circuits will be simply referred to as signal drive circuits in some cases).

Here, each of the scanning signal drive circuit and the video signal drive circuit is constituted of a plurality of semiconductor devices. Further, a number of signal lines which are arranged adjacent to each other are formed into a group, and one semiconductor integrated device is allocated to each group.

In this case, the plurality of respective semiconductor devices which constitute the video signal drive circuit, for example, are configured such that data is transmitted through a data transfer signal line between each semiconductor device, and another neighboring semiconductor device whereby the cumbersomeness of the constitution which supplies signals independently to respective semiconductor devices is obviated.

SUMMARY OF THE INVENTION

First of all, the inventors of the present invention have discovered a phenomenon in which, during the manufacturing process used in the fabrication of the image display device having constitution, a spark attributed to static electricity is generated between a data transfer signal line and a drain signal line which is arranged adjacent to the data transfer signal line, with the result that these lines are disconnected.

When the inventors pursued a cause of this phenomenon, following fact was discovered. That is, during the manufacturing process, the substrate repeats attraction and peeling-off thereof with respect to a metal-made fixing portion which supports the substrate, so that static electricity of high voltage, which is referred to as a so-called peel-off charge, is applied to the whole substrate.

In this case, there is a large difference between the area for the respective data transfer signal lines which are formed as a group of data transfer signal lines and the area for the respective drain signal lines which are formed as a group of drain signal lines, for example, adjacent to the group of data transfer signal lines. This is because, while the group of data transfer signal lines is formed in the periphery of the substrate, the group of drain signal lines extend across the panel.

Accordingly, there is a large difference between the quantity of static electricity which is charged to a group of data transfer signal lines and the quantity of static electricity which is charged to a group of drain signal lines; and, hence, a spark is liable to easily occur between a data transfer signal line and a drain signal line which are arranged adjacent to each other.

Further, during the manufacturing process, when the data transfer signal lines are isolated every other line and the drain signal lines temporarily adopt a constitution in which the drain signal lines are connected to each other using a common line, while the potential of the drain signal lines rapidly approaches 0, the potential of the data transfer signal lines is held at a high level. Accordingly, a potential difference of high voltage is generated between the data transfer signal lines and the drain signal lines; and, hence, a spark is liable to occur between a data transfer signal line and a drain signal line which are arranged adjacent to each other.

The present invention has been made in view of such circumstances, and it is an object of the present invention to provide an image display device in which, when a first group of signal lines and a second group of signal lines which differ in length from the first group of signal lines are arranged adjacent to each other, it is possible to prevent a disconnection attributed to static electricity generated by the occurrence of a spark between a signal line of the first group of signal lines and a signal line of the second group of signal lines which are arranged adjacent to each other.

Typical examples of the invention disclosed in this specification are as follows.

EXAMPLE 1

According to the image display device of the present invention, for example, a first signal line group constituted of a plurality of first signal lines which are arranged in parallel and a second signal line group constituted of a plurality of second signal lines which are arranged in parallel in a region adjacent to the group of first signal lines are formed on a substrate, and a dummy line is arranged between the first signal line group and the second signal line group.

EXAMPLE 2

The image display device according to the present invention is, for example, on the premise of the constitution of Example 1, characterized in that both ends of the dummy line are not connected to other signal lines.

EXAMPLE 3

The image display device according to the present invention is, for example, on the premise of the constitution of Example 1, characterized in that the dummy line has respective portions thereof connected to the first signal lines and the second signal lines which are arranged adjacent to the dummy line.

EXAMPLE 4

The image display device according to the present invention is, for example, on the premise of the constitution of any one of Examples 1 to 3, characterized in that the dummy line is constituted of a plurality of lines which are arranged in parallel.

EXAMPLE 5

The image display device according to the present invention is, for example, characterized in that a drive circuit which supplies signals to respective pixels in an image display part of a substrate through signal lines is formed outside the image display part, the drive circuit is constituted of a plurality of semiconductor devices, these respective semiconductor devices are configured such that data is supplied between these respective semiconductor devices and other semiconductor devices which are arranged adjacent to these respective semiconductor devices through data transfer signal lines, and a dummy line is formed between the signal lines and the data transfer signal lines.

EXAMPLE 6

The image display device according to the present invention is, for example, on the premise of the constitution of Example 5, characterized in that the signal lines are drain signal lines which supply video signals to respective pixels, and the drive circuit constitutes a video signal drive circuit.

EXAMPLE 7

The image display device according to the present invention is, for example, on the premise of the constitution of Example 5, characterized in that the signal lines are gate signal lines which supply scanning signals to respective pixels, and the drive circuit constitutes a scanning signal drive circuit.

EXAMPLE 8

The image display device according to the present invention is, for example, on the premise of the constitution of Example 5, characterized in that the signal lines which are arranged adjacent to each other are formed into a group, the signal lines which are formed into each group are directed in the converging direction outside the image display part and are connected to the respective semiconductor devices, and data transfer signal lines which connect between one semiconductor device and another semiconductor device, arranged adjacent to the one semiconductor device, are formed such that the data transfer signal lines loop around an area at the image display part side between these respective semiconductor devices.

EXAMPLE 9

The image display device according to the present invention is, for example, on the premise of the constitution of Example 5, characterized in that the dummy line is connected with the signal lines which are arranged adjacent to the dummy lines.

EXAMPLE 10

The image display device according to the present invention is, for example, on the premise of the constitution of Example 9, characterized in that the connection between the dummy lines and the signal lines are established at the image display part side.

EXAMPLE 11

The image display device according to the present invention is, for example, characterized in that a pair of electrodes are formed on each pixel within an image display part of a substrate, one of the pair of electrodes includes a counter electrode to which a counter voltage supply signal which becomes a reference with respect to signals supplied to another electrode of the pair of electrodes is supplied, a drive circuit which supplies signals to the respective pixels through signal lines is formed outside the pixel display part, the drive circuit is constituted of a plurality of semiconductor devices, a counter voltage supply signal line which supplies counter voltage supply signals to the counter electrode is formed on a region between the semiconductor device and another semiconductor device which is arranged adjacent to the former semiconductor device, and a dummy line is arranged between the signal lines and the counter voltage supply signal line.

The present invention is not limited to the above-mentioned constitutions and various modifications are conceivable without departing from the scope of technical concept of the present invention.

DESCRIPTION OF THE PREFERRED EMBODIMENTS

Preferred embodiments of an image display device of the present invention will be explained in conjunction with the drawings. In the explanation presented hereinafter, a liquid crystal display device will be considered as an example.

Embodiment 1

Overall Constitution

Figure 2A:
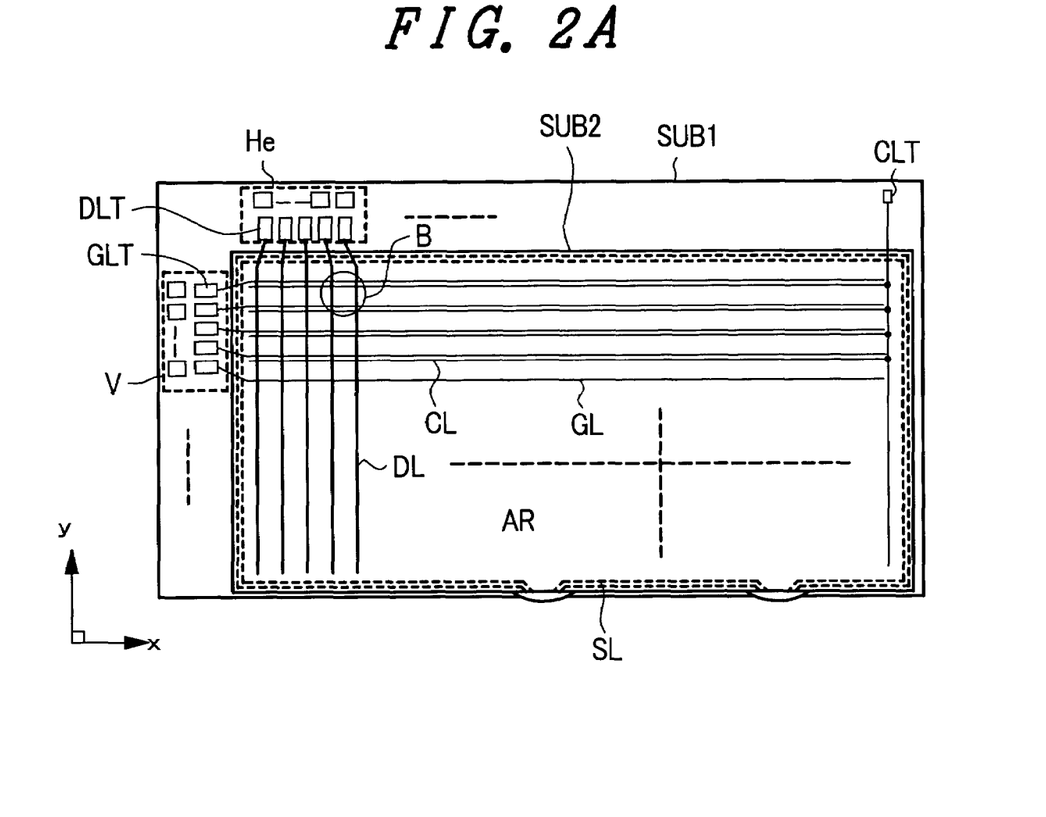
FIG. 2A is a plan view showing one embodiment of the overall structure of the image display device according to the present invention.
Figure 2B:
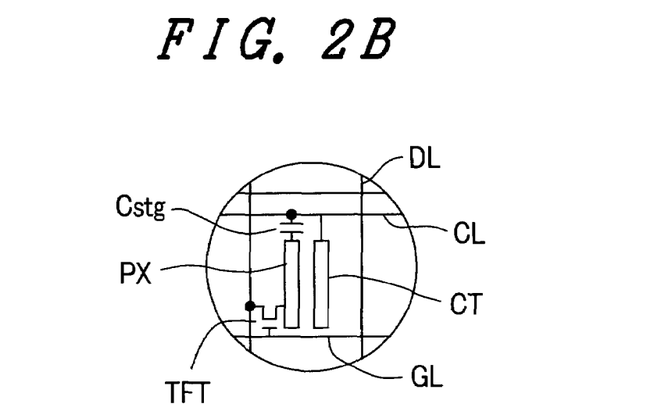
FIG. 2B is a schematic circuit diagram of a pixel in the area B in FIG. 2A.

FIG. 2A is a plan view showing one embodiment of a liquid crystal display device according to the present invention, and FIG. 2B shows a portion thereof in the form of an equivalent circuit.

In the drawing, a pair of transparent substrates SUB1, SUB2 are arranged to face each other with liquid crystal material sandwiched therebetween, wherein the liquid crystal material is sealed by use of a sealing material SL, which also performs the function of fixing the transparent substrate SUB2 to the transparent substrate SUB1.

On a liquid-crystal-side surface of the transparent substrate SUB1, in the area surrounded by the sealing material SL, gate signal lines GL which extend in the x direction and are arranged in parallel in the y direction and drain signal lines DL which extend in the y direction and are arranged in parallel in the x direction are formed. Regions defined by adjacent gate signal lines GL and adjacent drain signal lines DL constitute pixel regions, and a mass of these pixel regions in a matrix array constitute a liquid crystal display part AR.

Further, on respective pixel regions which are arranged in parallel in the x direction, a common counter voltage signal line CL runs in the inside of respective pixel regions. This counter voltage signal line CL constitutes a signal line which is used for supplying a voltage which becomes a reference with respect to video signals to counter electrodes CT in each pixel region, as will be described later.

In each pixel region, there are a thin film transistor TFT, which is driven by scanning signals from one-side gate signal line GL, and a pixel electrode PX to which the video signals from one-side drain signal line DL are supplied through the thin film transistor TFT. An electric field is generated between the pixel electrode PX and the counter electrode CT, which is connected to the counter voltage signal line CL, and the optical transmissivity of the liquid crystal material is controlled in response to the electric field.

Respective ends of the gate signal lines GL extend beyond the sealing material SL, and these extended ends constitute terminals GLT, to which output terminals of a scanning signal drive circuit V are connected. Further, to input terminals of the scanning signal drive circuit V, signals are inputted from a printed circuit board (not shown in the drawing) which is arranged outside the liquid crystal display panel.

The scanning signal drive circuit V is constituted of a plurality of semiconductor devices, wherein a plurality of gate signal lines GL, which are arranged adjacent to each other, are formed into a group, and one semiconductor device is allocated to each group.

In the same manner, respective ends of the drain signal lines DL extend beyond the sealing material SL, and these extended ends constitute terminals DLT, to which output terminals of a video signal drive circuit He are connected. Further, to input terminals of the video signal drive circuit He, signals are inputted from a printed circuit board (not shown in the drawing) which is arranged outside the liquid crystal panel.

The video signal drive circuit He is also constituted of a plurality of semiconductor devices, wherein a plurality of drain signal lines DL, which are arranged adjacent to each other are formed into a group, and one semiconductor device is allocated to each group.

Further, the counter voltage signal lines CL have right-side end portions thereof, as seen in the drawing, commonly connected, and a connection line extends beyond the sealing material SL, with an extended end of the connection line constituting a terminal CLT. A voltage which becomes the reference with respect to the video signals is supplied from the terminal CLT. The respective gate signal lines GL are sequentially selected one after another in response to the scanning signal lines from the scanning signal drive circuit V.

Further, to respective drain signal lines DL, video signals are supplied at the selection timing of the gate signal lines DL from the video signal drive circuit He.

<<Signal Drive Circuit>>

Figure 3:
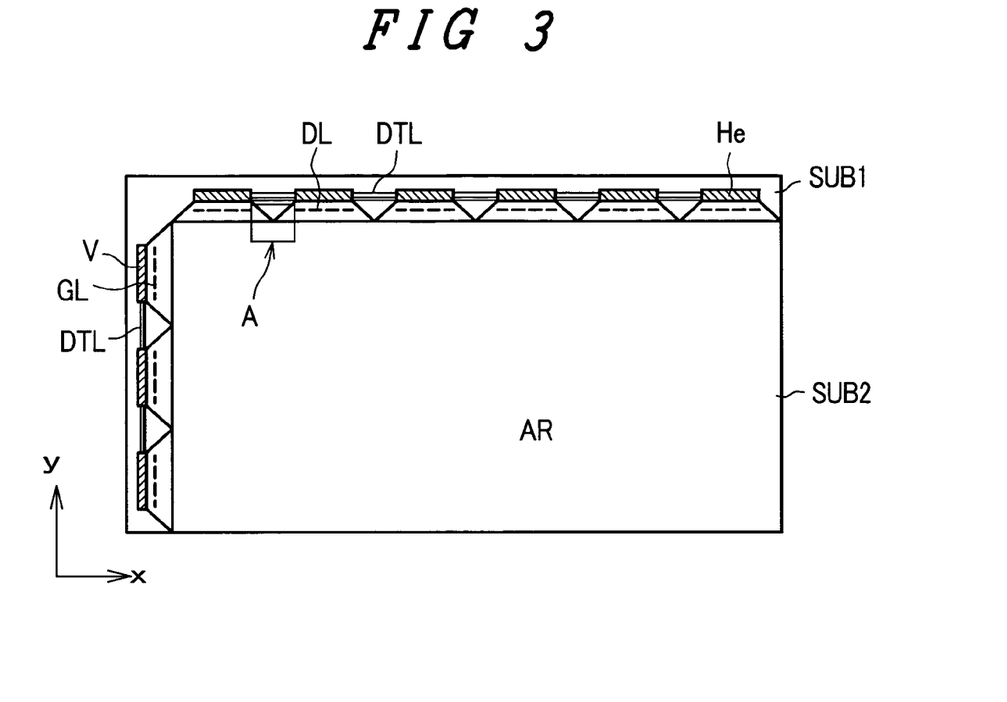
FIG. 3 is a plan view showing another embodiment of the overall structure of the image display device according to the present invention and is a view obtained by simplifying the structure seen in FIG. 2A.

FIG. 3 is a plan view of the liquid crystal display device similar to as FIG. 2A. This drawing shows a constitution in which the scanning signal drive circuit V is constituted of a plurality of semiconductor devices, and these semiconductor devices are arranged in parallel in the y direction on the transparent substrate SUB1; and, in the same manner, the video signal drive circuit He is constituted of a plurality of semiconductor devices, and these semiconductor devices are arranged in parallel in the x direction on the transparent substrate SUB1.

Further, the drain signal lines DL, which are pulled out from the liquid crystal display part AR side are formed in groups in a converging manner and are directed to a respective semiconductor device together with other drain signal lines DL which are arranged adjacent to each other and are formed into a group. This is because the pitch of the bumps of the semiconductor device to which respective drain signal lines DL are connected is smaller than the pitch of the respective drain signals lines DL in the liquid crystal display part AR.

In the same manner, the gate signal lines GL, which extend out from the liquid crystal display part AR side, are formed in groups in a converging manner and are directed to a respective semiconductor device together with other gate signal lines which are arranged adjacent to each other and are formed into a group.

Further, in this embodiment, among the semiconductor devices which constitute the video signal drive circuit He, a data transfer signal line DTL, which connects one semiconductor device to another semiconductor device that is arranged adjacent to the former semiconductor device, is formed on the transparent substrate SUB1. The signals are sequentially supplied to respective semiconductor devices through the data transfer signal line DTL, thus avoiding the cumbersomeness of supplying signals independently to respective semiconductor devices.

In the same manner, also with respect to the semiconductor devices which constitute the scanning signal drive circuit V, the data transfer signal line DTL, which connects one semiconductor device to another semiconductor device that is arranged adjacent to the former semiconductor device, is formed on the transparent substrate SUB1.

<<Arrangement Relationship Between Drain Signal Lines and Data Transfer Signal Lines>>

Figure 1:
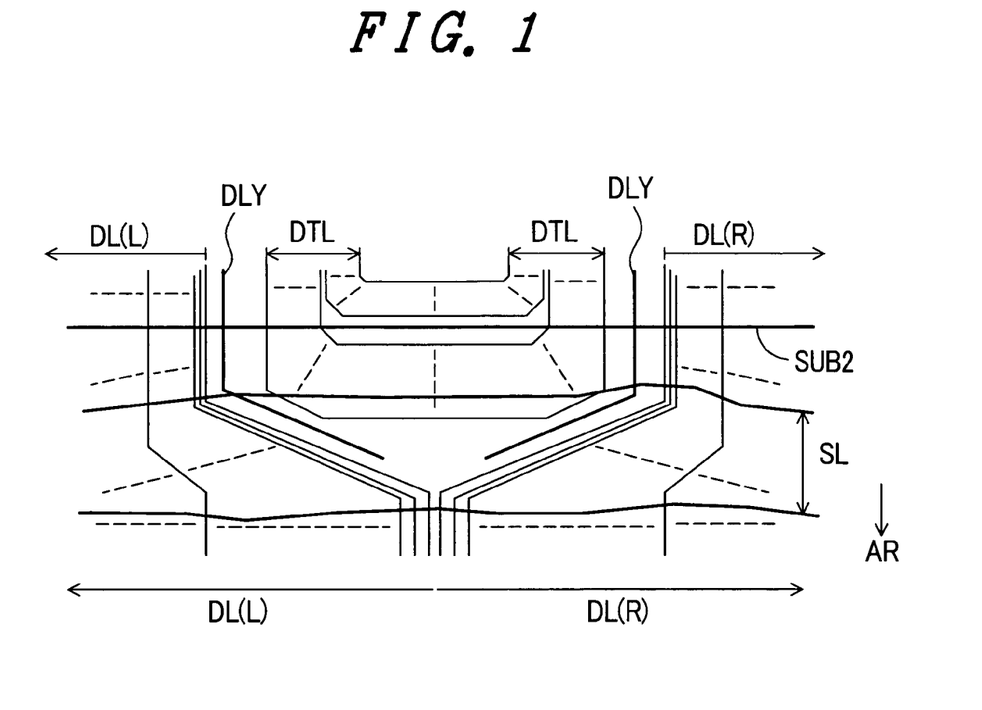
FIG. 1 is a plan view showing a representative part of one embodiment of an image display device according to the present invention and is a view corresponding to a portion A in FIG. 3.

FIG. 1 is a view showing the details of the arrangement and relationship between the drain signal lines DL and the data transfer signal lines DTL, and FIG. 1 is an enlarged view of a portion A shown in FIG. 3.

In the drawing, the drain signal line DL (R) group at the right side in the drawing is directed to the semiconductor device arranged at the right side in the drawing (although it is not shown in the drawing) and, hence, they are formed to have two bent portions, for example. That is, each drain signal line DL, which extends from the liquid crystal display part AR side, has its direction changed in the direction that the drain signal lines DL are converged to each other at the first bent portion and subsequently runs while the direction thereof changes to the bump side to be connected to the semiconductor device directly by the next bent portion.

In the same manner, the drain signal line DL (L) group at the left side in the drawing is also formed such that the group runs while having two bent portions, for example, to direct the drain signal line DL (L) group to the semiconductor device arranged at the left side in the drawing (although it is not shown in the drawing). Here, in this embodiment, respective bent portions of each drain signal line are configured to be positioned within a region where the sealing material SL is formed.

Thus, a region in which the drain signal lines DL are not formed is provided between the drain signal line DL (R) group and the drain signal line DL (L) group, which are directed in different directions, that is, in the right and left directions, while the data transfer signal line DTL group, which connects respective semiconductor devices arranged adjacent to the region, is formed such that they loop around the region between semiconductor devices.

The reason why the data transfer signal line DTL group is formed in such a roundabout manner is to reduce the width of the peripheral side of the transparent substrate SUB1 with respect to respective semiconductor devices which constitute the video signal drive circuit He, for example, so as to narrow the peripheral region, which is referred to as a so-called picture frame.

Accordingly, only a slight gap is formed between a drain signal line DL which is arranged at the side of the drain signal line DL group, which is connected to each semiconductor device as a group, and a data transfer signal line DTL which is arranged at the side of the data transfer signal line DTL group.

Figure 4:
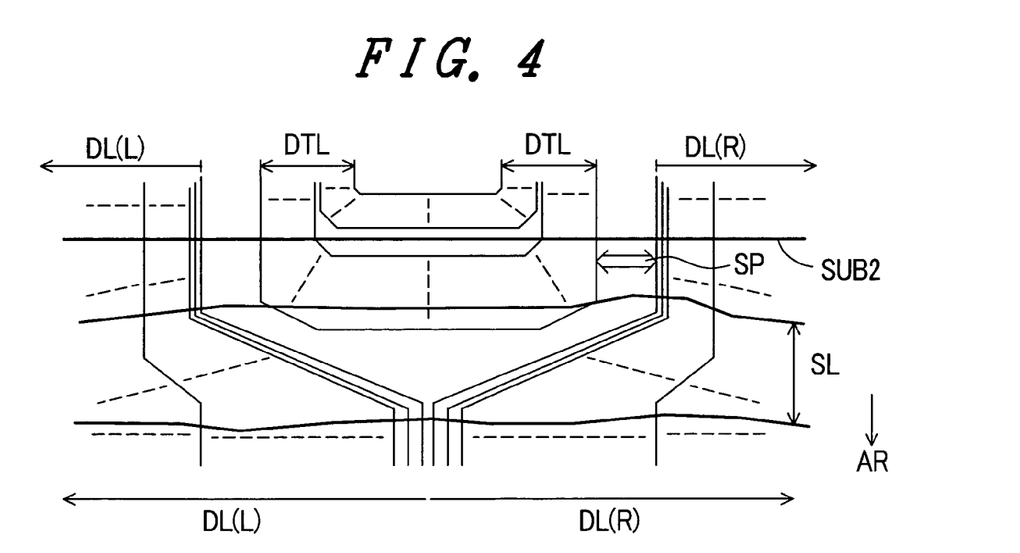
FIG. 4 is a plan view of an image display device showing an advantageous effect of the present invention.

In this case, a large difference exists between the length of each drain signal line DL and the length of each data transfer signal line DTL. Accordingly, the quantity of the charge that is charged to the drain signal line DL group due to static electricity and the quantity of the charge that is charged to the data transfer signal line DTL group due to static electricity will differ largely; and, hence, as shown in FIG. 4, which corresponds to FIG. 1, a spark SP is generated due to static electricity between the drain signal line DL and the data transfer signal line DTL which are arranged to adjacent to each other, so that either one of the signal lines may be disconnected.

Accordingly, in this embodiment, as shown in FIG. 1, in the above-mentioned gap, a so-called dummy line DLY is formed along the running direction of the drain signal line DL which is arranged at the side of the drain signal line DL group, for example. Here, the dummy line DLY is a line which does not contribute to signal transfer. In this embodiment, both ends of the dummy line DLY are not connected to any other lines.

Due to such a constitution, a spark can be generated between the drain signal line DL, which is arranged at the side of the drain signal line DL group, and the dummy line DLY which is arranged adjacent to the drain signal line DL, and, hence, disconnection of the drain signal line DL can be prevented. Further, a spark can be generated between the data transfer signal line DTL, which is arranged at the side of the data transfer signal line DTL group, and the dummy line DLY, which is arranged adjacent to the data transfer signal line DTL, and, hence, disconnection of the data transfer signal line DTL can be prevented.

Figure 5:
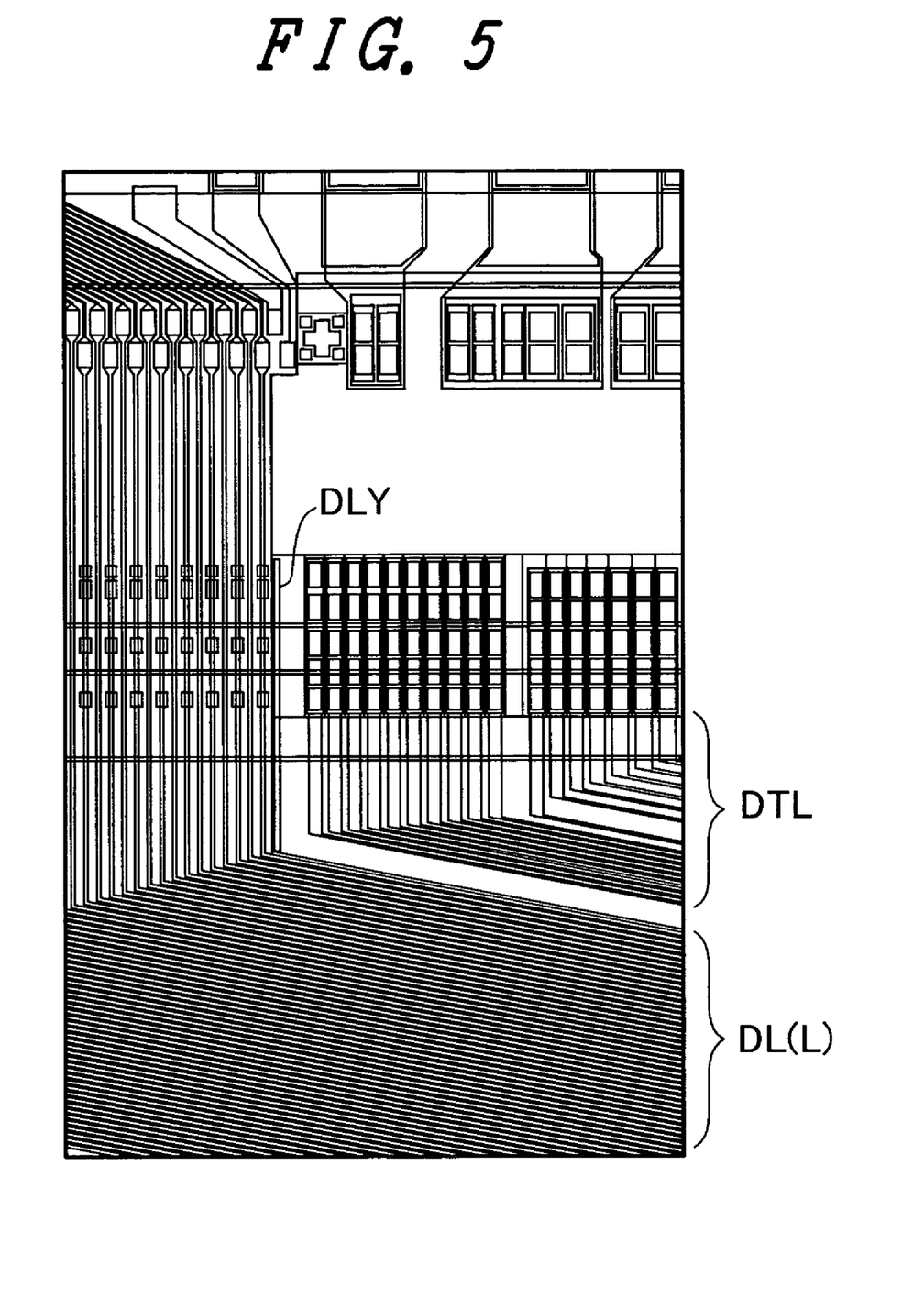
FIG. 5 is a plan view showing a product to which the present invention is applied showing structure corresponding to FIG. 1.
Figure 6:
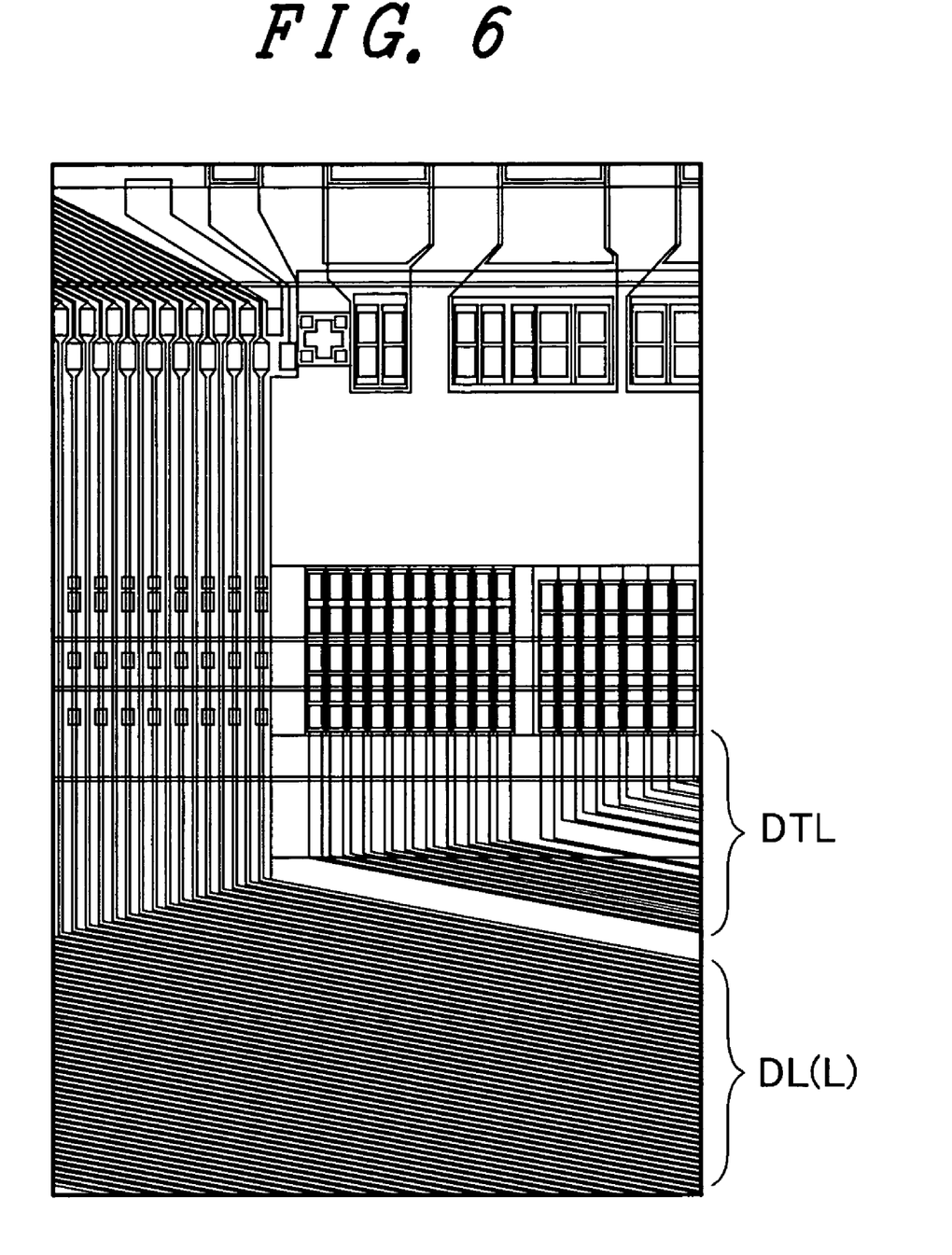
FIG. 6 is a plan view showing a product to which the present invention is not applied showing structure corresponding to FIG. 4.

Here, in applying the present invention to an actual product, the constitution which corresponds to FIG. 1 is shown in FIG. 5, and the constitution which corresponds to the constitution shown in FIG. 5, and is not provided with the dummy line DLY, is shown in FIG. 6.

Embodiment 2

Figure 7:
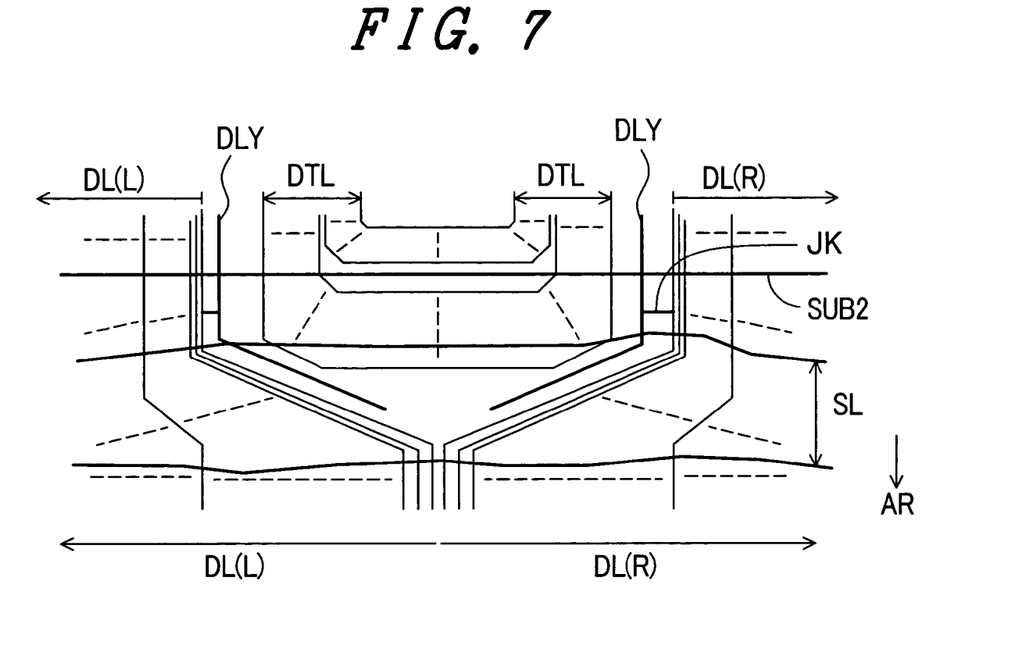
FIG. 7 is a plan view showing a representative part of one embodiment of the image display device according to the present invention.

FIG. 7 is a view showing another embodiment of the image display device according to the present invention, which is similar to that of FIG. 1.

The feature which makes this embodiment different from the constitution shown in FIG. 1 lies in the fact that the dummy line DLY is electrically connected to the neighboring drain signal line DL through a connecting portion JK. Due to such a connection, the potential of the dummy line DLY can be set to be equal to the potential of the drain signal line DL which is positioned at the side of the drain signal line DL group, and, hence, the potential of the dummy line DLY can be made stable. Accordingly, a spark attributed to static electricity can be surely generated at the dummy line DLY.

In this case, the line width of the drain signal line DL is generally set to be smaller than the line width of the data transfer signal line DTL. Further, it is preferable that the line width of the dummy line DLY is set to a value which is 3/4 to 5/4 of the line width of the drain signal line DL. This provision is made to make the capacitance of the drain signal line DL, which is electrically connected to the dummy line DLY, approximate to the capacitance of the other drain signal line DL. Due to such a constitution, the luminance can be made uniform.

Embodiment 3

Figure 8:
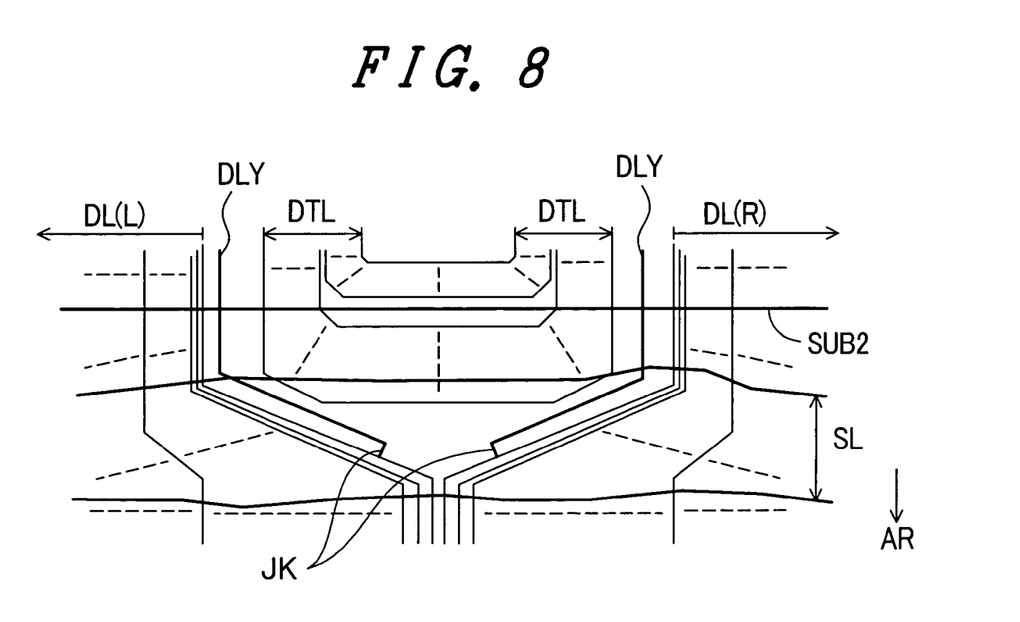
FIG. 8 is a plan view showing a representative part of one embodiment of an image display device according to the present invention.

FIG. 8 is a view showing another embodiment of the image display device according to the present invention, which is similar to that of FIG. 7.

In the same manner as the embodiment shown in FIG. 7, although the dummy line DLY is connected to the drain signal line DL which is arranged adjacent to the dummy line DLY, the connecting portion JK is provided to an end portion at the liquid crystal display part AR side and is not provided to the end portion at the peripheral side of the transparent substrate SUB1.

Due to such a configuration, the disconnection of the dummy line DLY by sparking occurs at a position close to the liquid crystal display part AR. On the other hand, if the disconnection of the dummy line DLY were to occur at the peripheral side of the transparent substrate SUB1, there exists the possibility that the so-called electrolytic corrosion will be generated at the disconnected portion and that the electrolytic corrosion will progress from the disconnected portion.

Further, the side of the dummy line DLY which is close to the liquid crystal display part AR is covered with the sealing material SL, thus ensuring a state in which electrolytic corrosion is hardly generated from that side even when the disconnection is generated.

Embodiment 4

Figure 9:
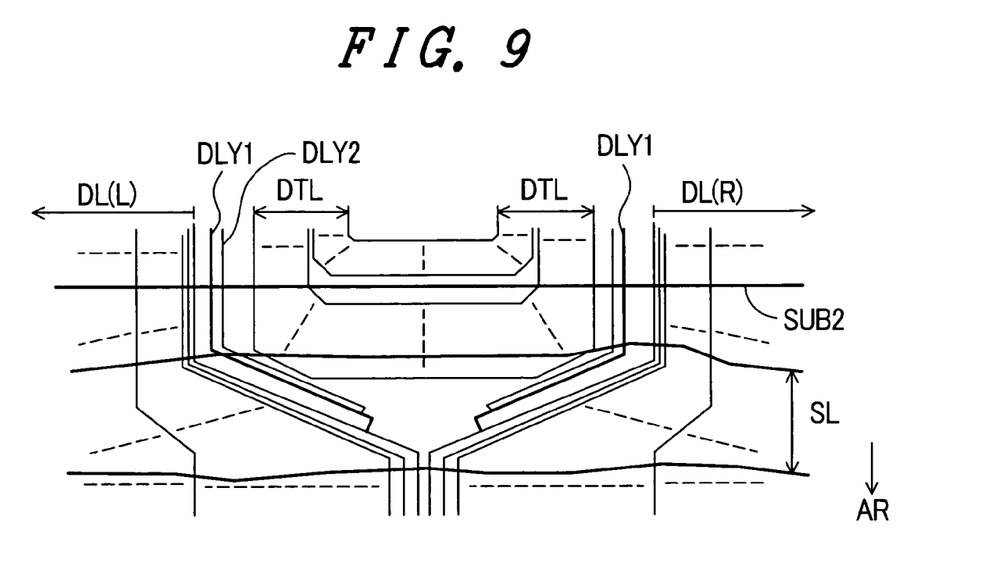
FIG. 9 is a plan view showing a representative part of one embodiment of the image display device according to the present invention.

FIG. 9 is a view showing another embodiment of the image display device according to the present invention, which is similar to that of FIG. 8.

The feature which makes this embodiment different from the embodiment shown in FIG. 8 lies in the fact that when the dummy line DLY shown in FIG. 8 is used as a first dummy line DLY1, a second dummy line DLY2 is provided adjacent to the first dummy line DLY 1. Further, the second dummy line DLY2 is connected to the first dummy line DLY1 at an end portion on the liquid crystal display part AR side.

Due to such a constitution, the function of the dummy line DLY is further strengthened.

Embodiment 5

Figure 10:
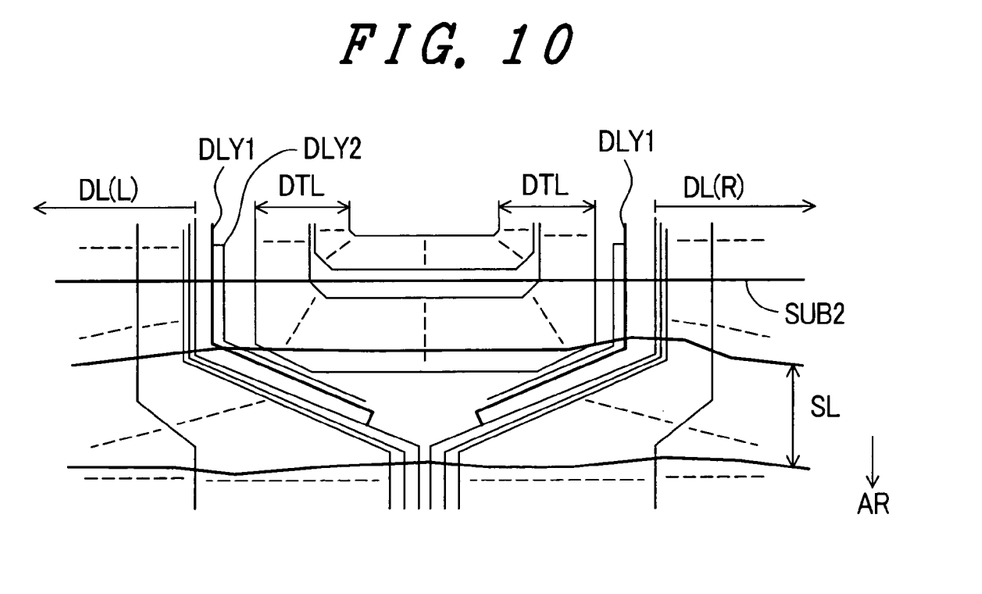
FIG. 10 is a plan view showing a representative part of one embodiment of the image display device according to the present invention.

FIG. 10 is a view showing another embodiment of the image display device according to the present invention, which is similar to that of FIG. 9.

The construction which makes this embodiment different from the embodiment shown in FIG. 9 lies in the fact that the connection of the second dummy line DLY2 with the first dummy line DLY1 is not made at the end portion near the liquid crystal display part AR side, but is made at one end near the peripheral side of the transparent substrate SUB1.

Due to such a connection, even when a disconnection is generated at the second dummy line DLY2 by sparking, the electrolytic corrosion which is generated at such a portion must go through the first dummy line DLY1 to reach the drain signal line DL, and, hence, the propagation of the electrolytic corrosion becomes difficult structurally.

Embodiment 6

Figure 11:
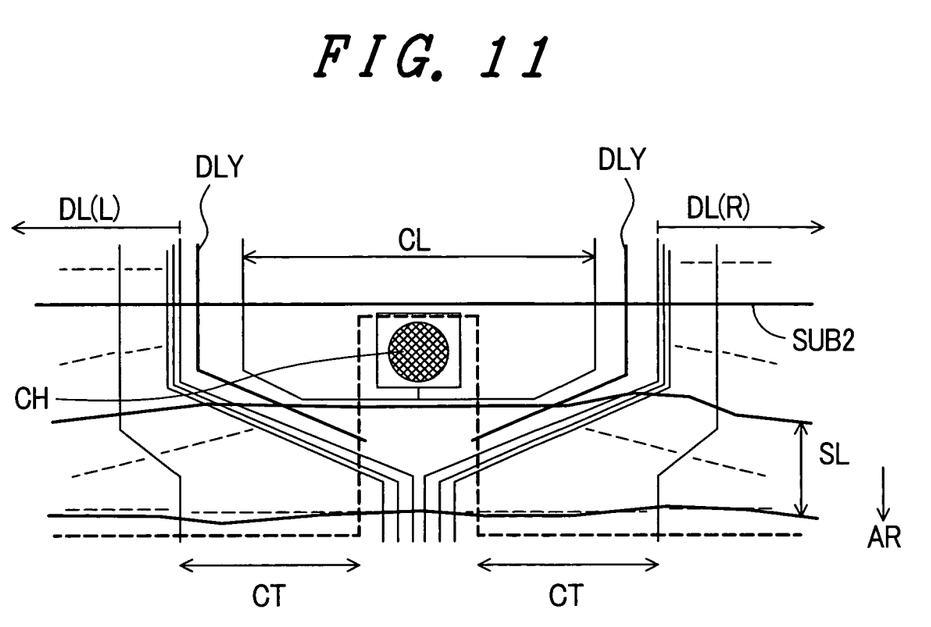
FIG. 11 is a plan view showing a representative part of one embodiment of the image display device according to the present invention.

FIG. 11 is a view showing another embodiment of the image display device according to the present invention, which is similar to that of FIG. 1.

The feature which makes this embodiment different from the embodiment shown in FIG. 1 lies in the fact that between respective semiconductor devices which constitute the video signal drive circuit He, there exist some portions where the above-mentioned data transfer signal line DTL is not arranged and the counter voltage signal line CL is arranged instead.

In this embodiment, the portion where the counter voltage signal line CL is arranged is shown in the drawing. The counter voltage signal line CL is formed as a layer equal to the drain signal line DL, for example, and is formed as a layer (an upper layer) different from that of the counter electrode CT which extends to the liquid crystal display part AR side by way of an insulation film.

Accordingly, the counter voltage signal line CL is electrically connected to the counter electrode CT through a contact hole CH formed in the insulation film. Here, since the drain signal line DL group is arranged around the counter voltage signal line CL, the above-mentioned drawback arises due to the difference in the charge quantity of static electricity between them. Accordingly, also in this embodiment, the dummy line DLY is provided between the counter voltage signal line CL and the drain signal line DL group.

It is needless to say that the technical concept employed in the above-mentioned embodiments is also applicable to the specific constitution of the dummy line DLY in this embodiment.

The above-mentioned respective embodiments are directed to constitutions which prevent a disconnection or the like attributed to a spark generated between the drain signal line DL and the data transfer signal line DTL, which connects respective semiconductor devices of the video signal drive circuit He. However, it is needless to say that the disconnection or the like due to a spark generated between the gate signal line GL and the data transfer signal line which connects respective semiconductor devices of the scanning signal drive circuit V can be prevented by a constitution similar to the above-mentioned constitution.

Further, although the above-mentioned image display devices have been described with reference to liquid crystal display devices, as an example, the present invention also is applicable to so-called organic EL display devices, for example. This is because an organic EL display device includes a pair of electrodes with an organic EL layer disposed therebetween in the constitution of the pixel and, therefore, has substantially the same constitution as the liquid crystal display device with respect to other structural features.

As has been explained heretofore, according to the image display device of the present invention, when one signal line group and another signal line group, which differs in length from the one signal line group, are arranged close to each other, a disconnection due to static electricity caused by a spark generated between a signal line of one signal line group and a signal line of the other signal line group which are arranged adjacent to each other can be prevented.

What is claimed is:

1. An image display device is characterized in that
a pair of electrodes are formed on each pixel within an image display part of a substrate, one of the pair of electrodes includes a counter electrode to which a counter voltage supply signal which becomes a reference with respect to signals supplied to another electrode of the pair of electrodes is supplied,
a drive circuit which supplies signals to the respective pixels through signal lines arranged in a plane of the substrate is formed outside the pixel display part, the drive circuit is constituted of a plurality of semiconductor devices, a counter voltage signal line arranged in the plane of the signal lines of the substrate which supplies counter voltage signals to the counter electrode is formed on a region between one semiconductor device and another semiconductor device which is arranged adjacent to the one semiconductor device, and
a dummy line is arranged in both of the plane of the signal lines of the substrate and in the plane of the counter voltage signal line of the substrate and between the signal lines in the plane of the substrate and the counter voltage signal line in the plane of the substrate outside of the image display part;
wherein the dummy line is formed in the plane of the substrate along with both the signal lines in the plane of the substrate and the counter voltage signal line in the plane of the substrate so as to extend along at least one of the signal lines.

2. The image display device according to claim 1, wherein the dummy line is formed into a seal material which seals a pair of substrates.

3. The image display device according to claim 1, wherein the signal lines are drain signal lines which supply video signals to respective pixels.

4. The image display device according to claim 1, wherein the dummy line is arranged in the plane of the substrate between the signal lines in the plane of the substrate and the counter voltage signal line in the plane of the substrate so as to enable prevention of a disconnection due to static electricity caused by a spark generated between one of the signal lines and the counter voltage signal line.

5. The image display device according to claim 1, wherein the signal lines have a bent portion along the extension thereof, and the dummy line extends along the signal lines and has a corresponding bent portion.

6. The image display device according to claim 1, wherein a contact hole us formed in a region of the counter voltage signal line, and the contact hole connects the counter electrode to the counter voltage signal line.

* * * * *